United States Patent

[11] 3,617,659

| [72] | Inventor | Jerry H. Freeman |
| --- | --- | --- |
|  |  | Mt. Prospect, Ill. |
| [21] | Appl. No. | 22,539 |
| [22] | Filed | May 25, 1970 |
| [45] | Patented | Nov. 2, 1971 |
| [73] | Assignee | Power Pak, Inc. |
|  |  | Chicago, Ill. |
|  |  | Continuation-in-part of application Ser. No. 677,976, Oct. 25, 1967, now abandoned. |

[54] ELECTRIC CORD REEL
31 Claims, 38 Drawing Figs.

[52] U.S. Cl. ................................................ 191/12.2,
242/107
[51] Int. Cl. ................................................ H02g 11/00
[50] Field of Search .................................... 191/12.2,
12.4; 339/105; 242/107

[56] References Cited
UNITED STATES PATENTS

| 2,647,960 | 8/1953 | Benjamin | 191/12.4 |
| 3,182,139 | 5/1965 | Meletti | 191/12.4 |
| 2,948,913 | 8/1960 | Tamarin | 191/12.2 X |
| 2,375,917 | 5/1945 | Gross | 191/12.2 R |
| 3,040,139 | 6/1962 | Appleton | 191/12.2 R |

*Primary Examiner*—Arthur L. La Point
*Assistant Examiner*—George H. Libman
*Attorney*—Wallenstein, Spangenberg, Hattis & Strampel ABSTRACT: A cord reel structure for an electric cord includes a stationary arbor and a reel for an electric cord rotatably mounted thereon. The reel includes a molded synthetic plastic hollow hub having a cylindrical wall, a circular partition wall forming a spring motor chamber for a spiral spring and a slipring chamber for a slipring electrical connector in the hub, and a central bearing in the partition wall for rotatably mounting the hub on the arbor. An annular flange extends radially from each end of the hub to form the reel. The slipring electrical connector includes a slipring block having slipring contacts and a contact block having spring contacts engaging the slipring contacts, one of the blocks being mounted in the slipring chamber in the hub and the other being stationarily mounted, to provide for electrical connection to the electric cord on the reel.

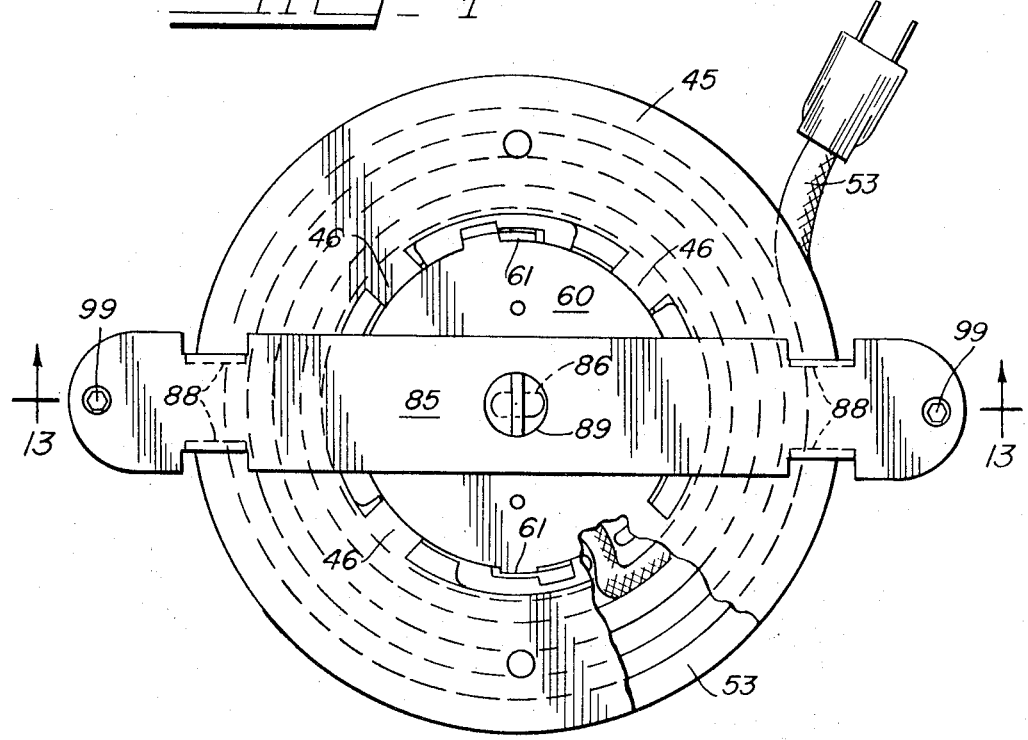
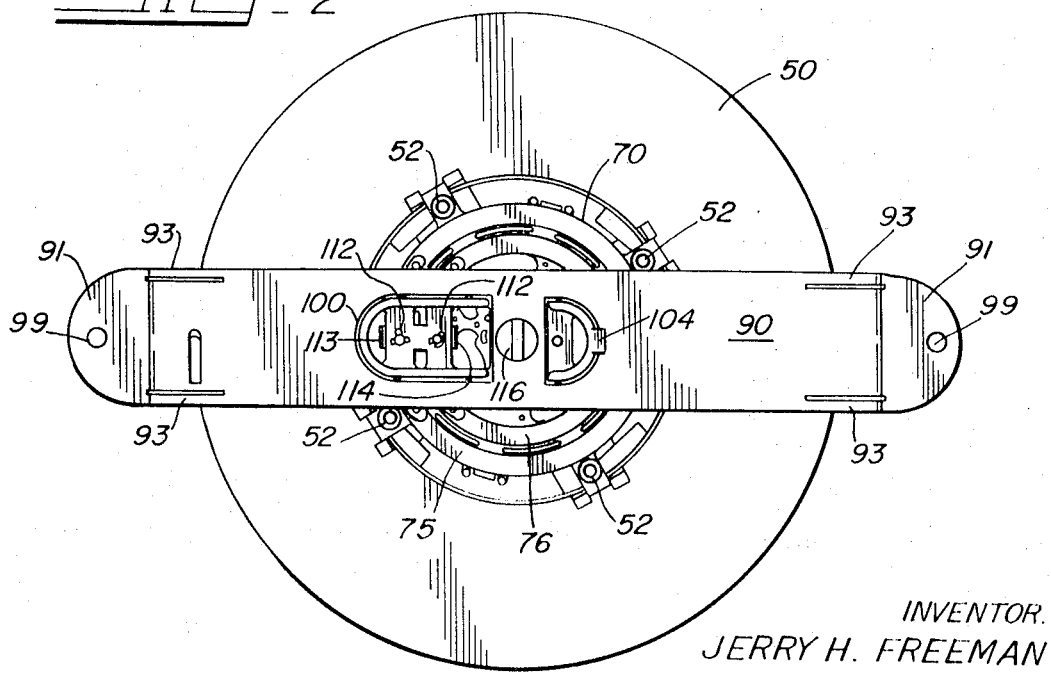

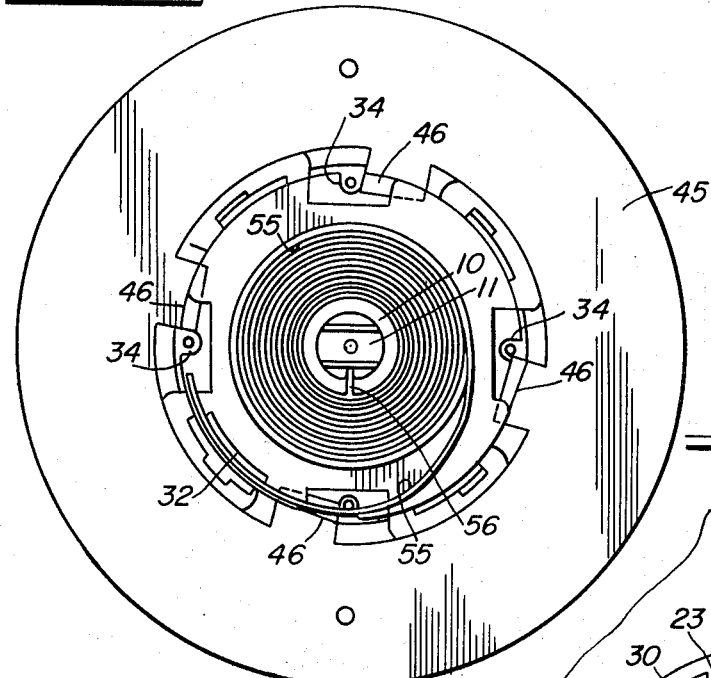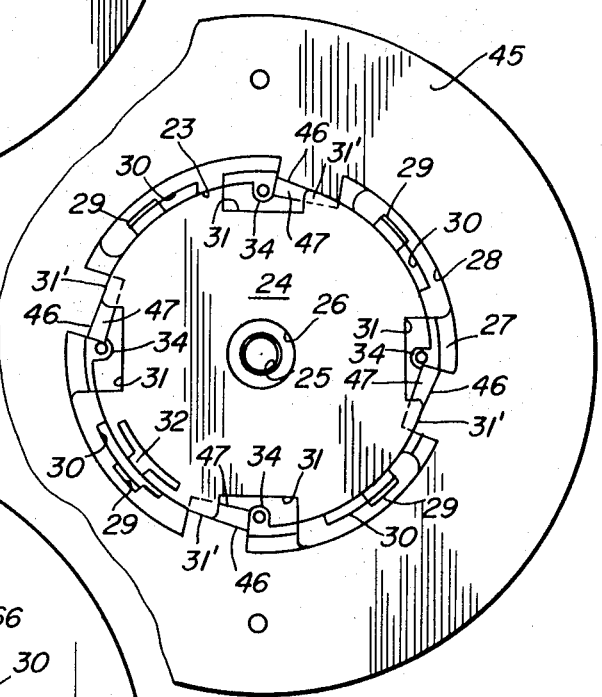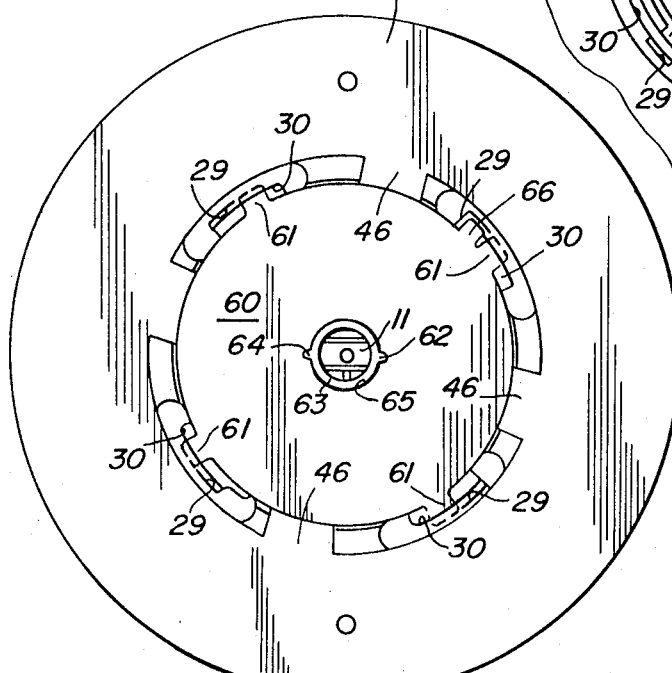

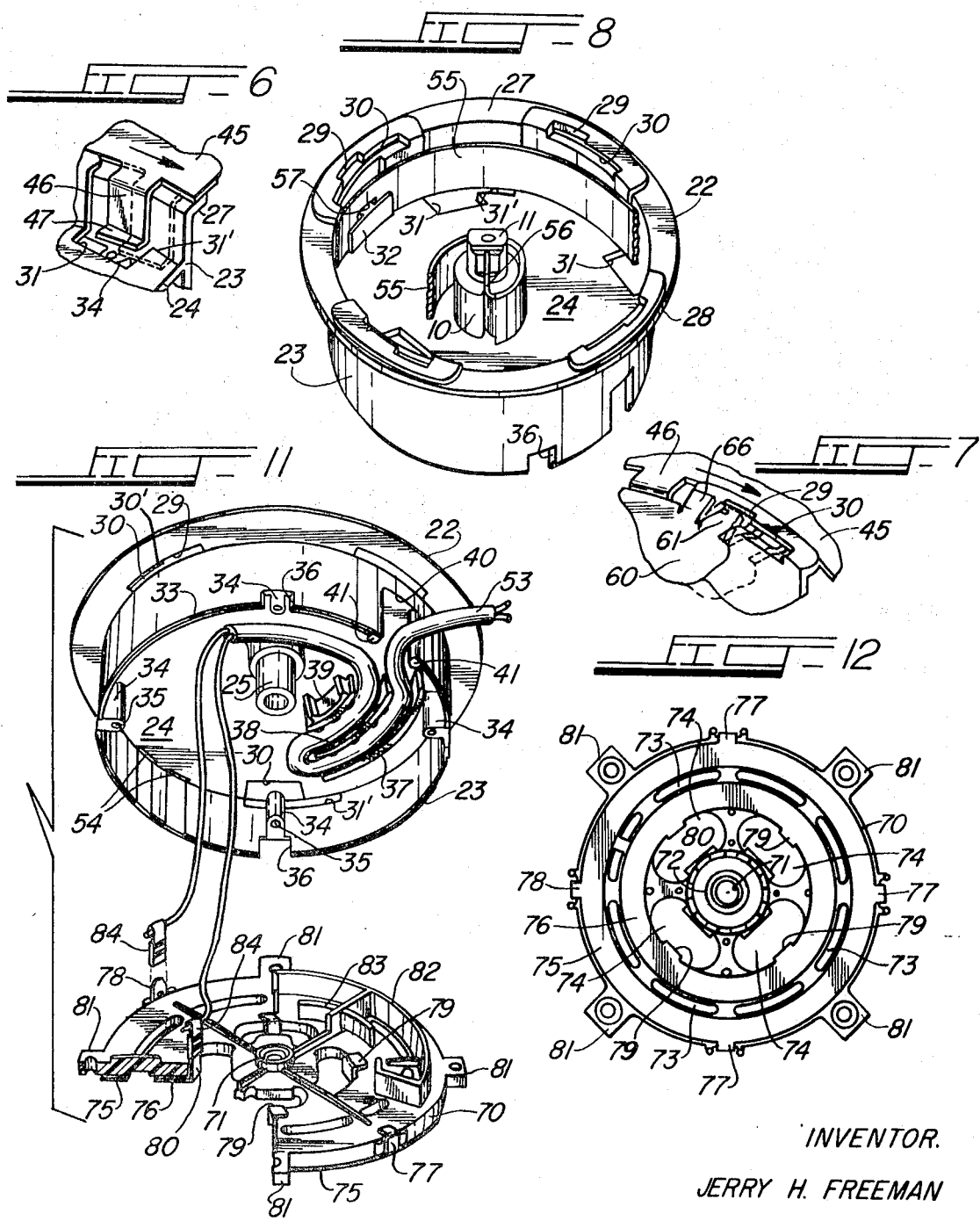

INVENTOR.
JERRY H. FREEMAN

FIG-13

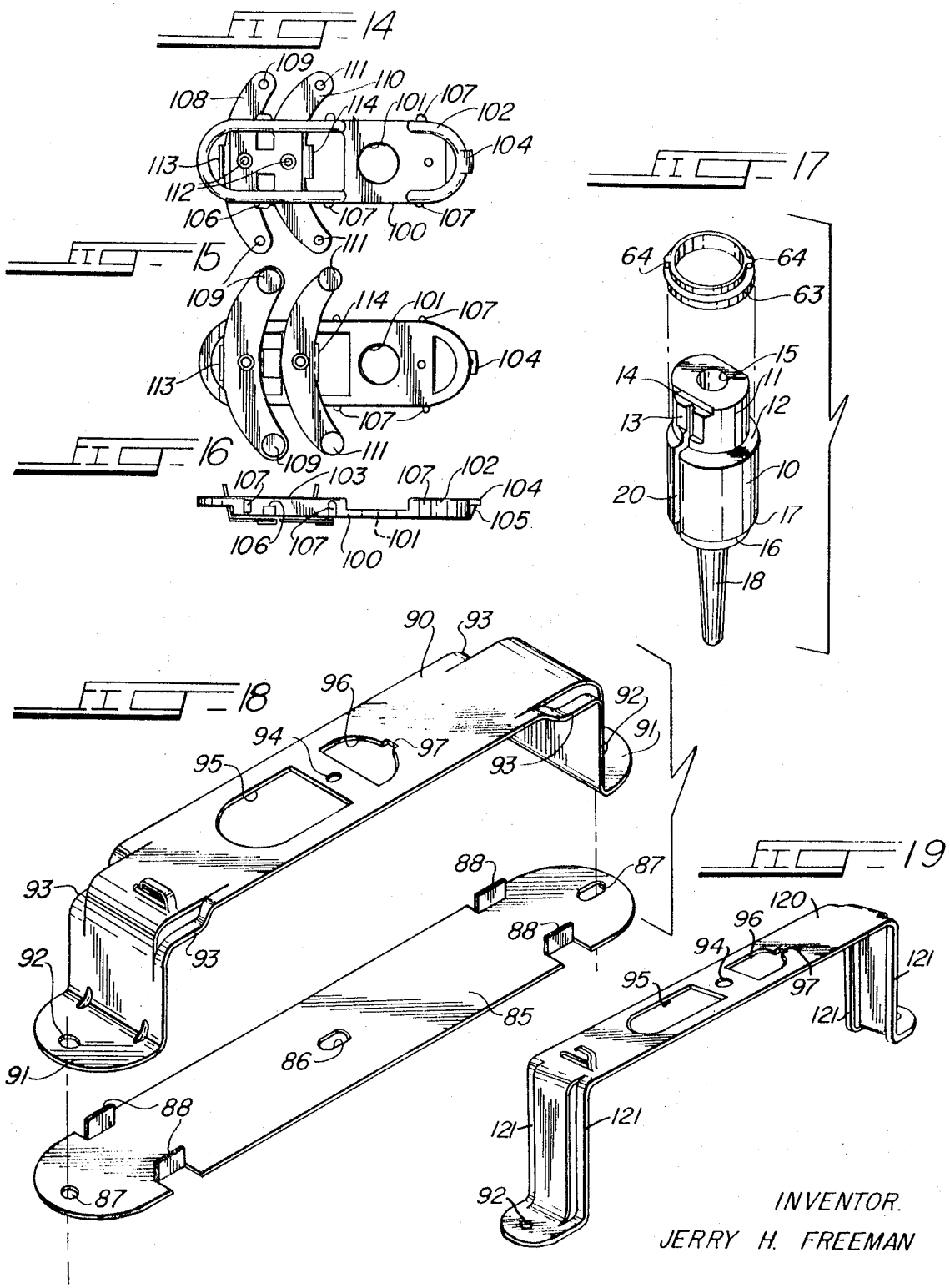

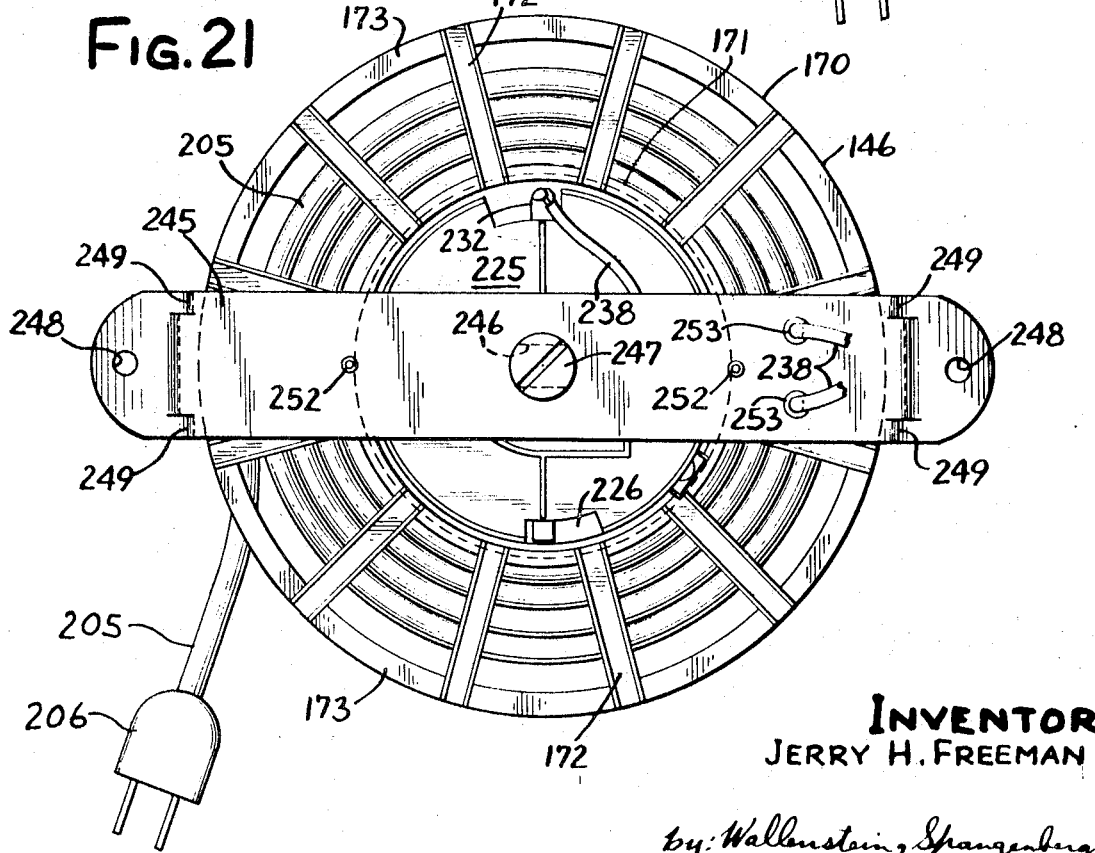

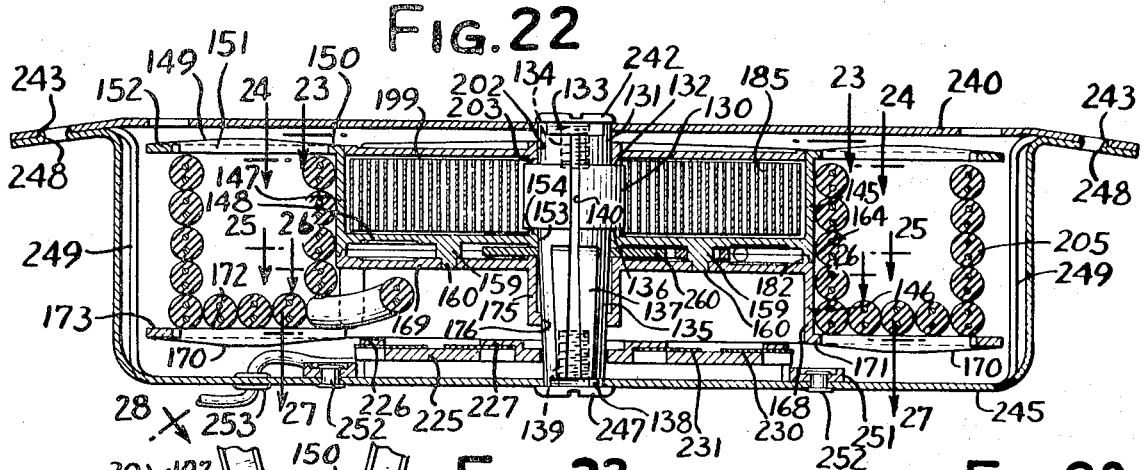

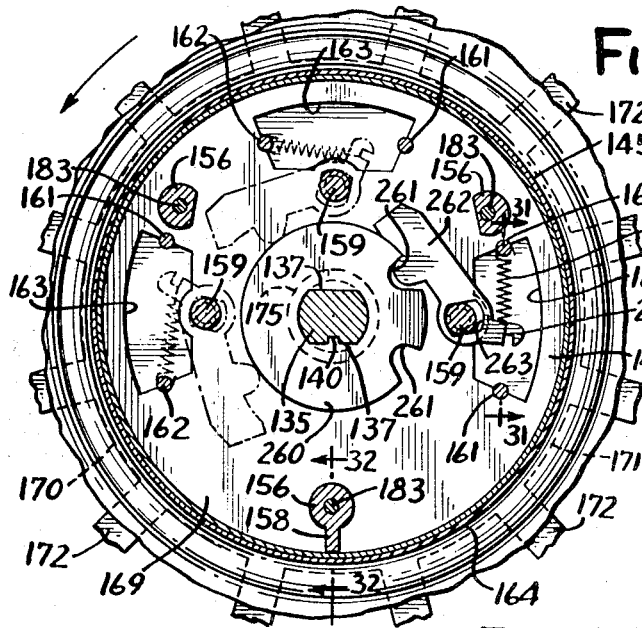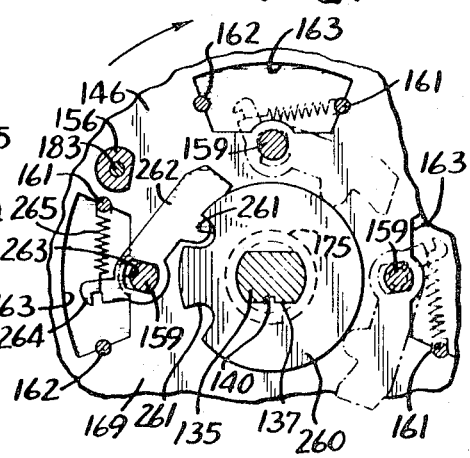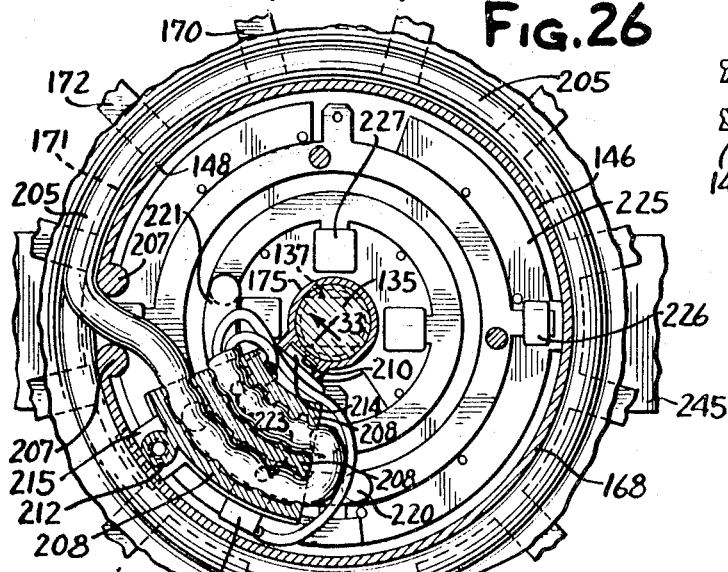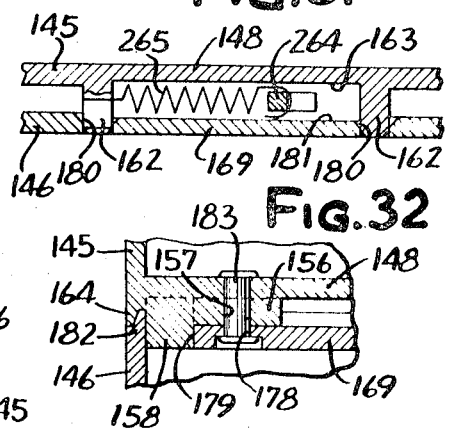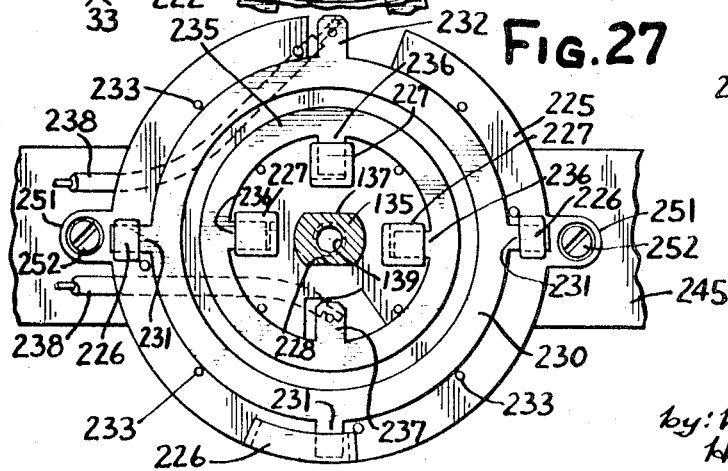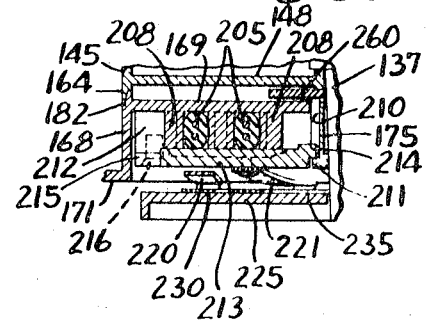

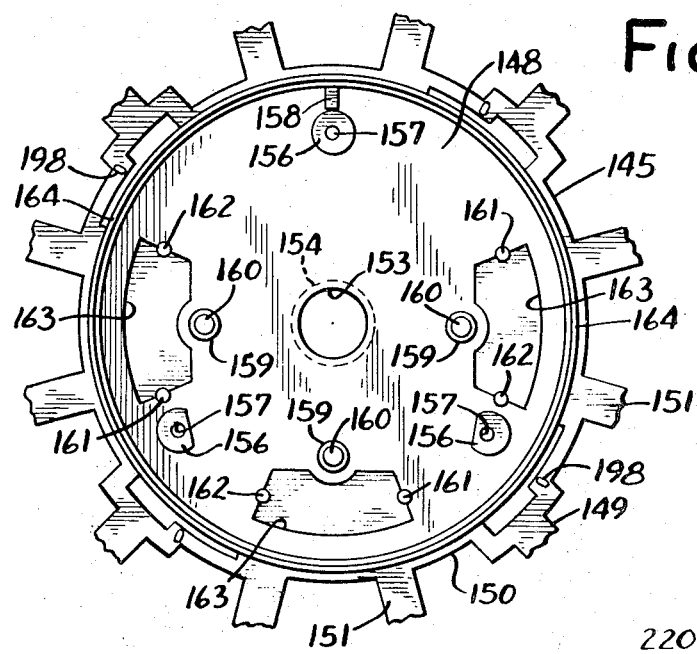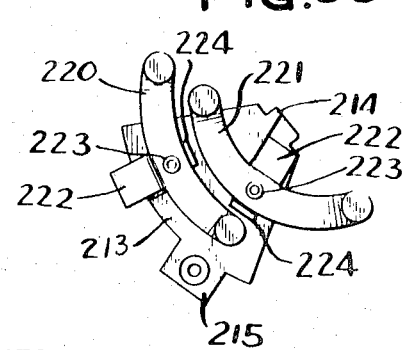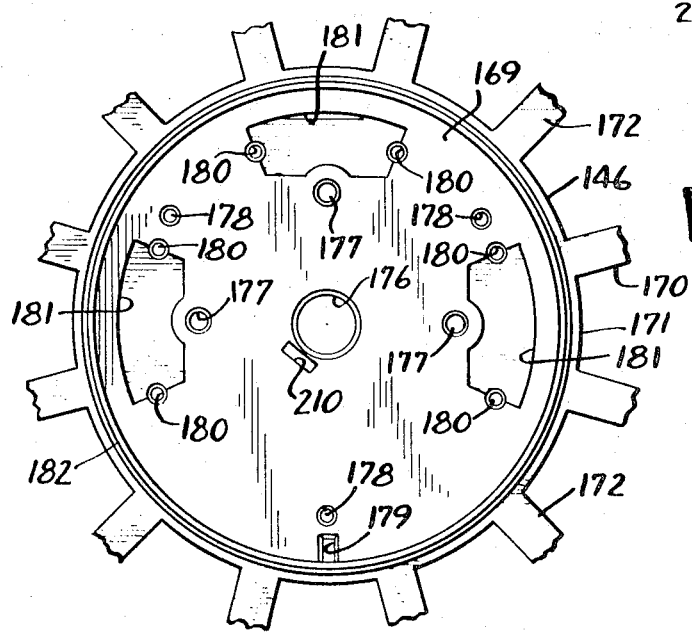

ELECTRIC CORD REEL

This application is a continuation-in-part of application Ser. No. 677,976, filed Oct. 25, 1967 for Electric Cord Reel, now abandoned.

The principal object of the invention is to provide improved cord reel structures for an electric cord which are simple and rugged in construction, which are foolproof in operation, which are inexpensive to manufacture and assemble, and which are a decided improvement over the many cord reel structures of the prior art.

Briefly, among other things, the improvements in the cord reel structures of this invention include a molded high-temperature and flame-resistant synthetic plastic hollow hub which is rotatably mounted on the stationary arbor and which comprises a cylindrical wall, a circular radially arranged partition wall intermediate the ends of the hub and forming a spring motor chamber and a slipring chamber within the hub, and a central bearing in the partition wall for rotatably mounting the hub on the arbor. An annular flange extends radially from each end of the hub and cooperates with the cylindrical wall of the hub to form a reel for receiving the electric cord coiled thereon. A spiral spring is arranged in the spring motor chamber for rotating the hub in one direction to coil the electric cord thereon between the flanges but allowing uncoiling of the electric cord therefrom. A cover is secured to one end of the hub for enclosing the spring motor chamber. A slipring electrical connector is arranged in the slipring chamber in the hub to provide electrical connection to the electric cord on the reel. In one form of the invention, a circular slipring block having slipring contacts is arranged in the slipring chamber and a stationary contact or pickup block has spring contacts engaging the slipring contacts. In another form of the invention a contact block having spring contacts is arranged in the slipring chamber and a stationary slipring block has slipring contacts engaging the spring contacts.

In one form of the invention illustrated herein, the hub is a single-piece molded hub and the flanges on the ends of the hub forming the reel are separate and preferably made of metal, such as galvanized steel or the like and they cooperate with the high-temperature and flame-resistant synthetic plastic hub to dissipate and retard the flow of heat generated by the coiled electric cord into the interior of the hub. One of the metal flanges is secured to the hub by a twist lock, and the other is secured to the hub by screws, the screws also preventing untwisting and unlocking of said one flange. The cover for the spring motor chamber is also secured in place on the hub by a twist lock. The stationary arbor is provided with a radial slit within the spring motor chamber for receiving one end of the spiral spring, and the other end of the spiral spring is notched to be received over a T-bar formed on the cylindrical wall of the hub, the arrangement being such that either left-hand or right-hand operating springs may be utilized. The cover for the spring motor chamber is also provided with a bearing which is arranged within the spring motor chamber and which receives the stationary arbor. The bearing in the partition wall in the hub is elongated and extends into the slipring chamber to provide maximum bearing support for the hub on the stationary arbor.

The cylindrical wall of the hub is provided with a reinforced opening for directing the electric cord into the slipring chamber, and the partition wall in the slipring chamber is provided with a cord lock for anchoring the electric cord in the slipring chamber, the slipring block in the slipring chamber also cooperating with the cord lock in this respect. The slipring block is secured to the end of the hub by the same screws that secure the flanges in place. The slipring block also has a bearing cooperating with the stationary arbor, and it is provided with a plurality of arcuate slots to provide circular supports for the slipring contacts and air passages into the slipring chamber to assist in keeping the same cool. The slipring contacts are secured in place on the circular supports in the slipring block by crimping over tabs thereon. Quick connect fittings are utilized for connecting the electric cord to the slipring contacts. The stationary arbor is carried by a pair of support members and the pickup block having the spring contacts is carried by one of those support members. The pickup block is held in place in the support member by the contact spring pressure and by tabs on the pickup block. The electric leads are spot welded to the spring contacts. Other improvements in this form of the cord reel structure will become apparent from the more detailed description appearing hereafter.

In the other form of the invention illustrated herein, the hub forming the reel is a two part hub, each part being a molded high-temperature resistant synthetic plastic part and including a cylindrical wall, an integral circular radially arranged wall at the inner end of the cylindrical wall and an integral annular flange extending radially from the outer end of the cylindrical wall. The two parts are secured together with their inner circular walls adjacent to each other to provide the two part hollow hub having a cylindrical wall, a circularly arranged partition wall intermediate the ends of the hub and forming the spring motor chamber and the slipring chamber within the hub and an annular flange extending radially from each end of the hub and cooperating with the cylindrical wall to form the reel for receiving the electric cord coiled thereon. The two molded parts are provided with interacting projections and recesses for fixing the concentric and angular positions of the two parts forming the reel. A pawl and ratchet mechanism may be arranged between the adjacent circular walls of the two parts of the hub to releasably prevent winding of the electric cord on the cord reel. The molded annular flanges preferably comprise radial spokes terminating in rims to dissipate and retard the flow of heat generated by the coiled electric cord into the interior of the hub.

Like the first mentioned form of the invention, the cover for the spring motor chamber is also secured in place on the hub by a twist lock, the stationary arbor is also provided with a radial slit within the spring motor chamber for receiving one end of the spiral spring, and the other end of the spiral spring is notched to be received over a T-bar formed on the cylindrical wall of the hub, the arrangement being such that either left-hand or right-hand operating springs may be utilized. The cover of the spring motor chamber is also provided with a bearing which receives the stationary arbor. The central bearing in the partition wall in the hub is also elongated to provide maximum bearing support for the hub on the stationary arbor.

Also, like the first-mentioned form of the invention, the hub is provided with a reinforced opening for directing the cord into the slipring chamber, and the partition wall in the slipring chamber is provided with a cord lock for anchoring the electric cord in the slipring chamber, but, here, the contact block mounted in the slipring chamber cooperates with the cord lock in this respect. The contact block is provided with an ear received in a slot below a shoulder in the longitudinally extended bearing in the hub for mounting the contact block in the slipring chamber and a screw is also utilized in connection with such mounting. The spring contacts, which are eyeleted to the contact block and held in proper angular position thereon by shoulders on the block, engage slipring contacts on a stationary slipring block. The slipring block is provided with overhanging tabs for receiving tabs on the slipring contacts for securing the slipring contacts in place thereon. The cord is spot welded to the spring contacts and electric leads are spot welded to the slipring contacts. The stationary arbor is carried by a pair of support members and the slipring block is carried by one of those support members. Other improvements in this further form of the cord reel structure will become apparent from the more detailed description appearing hereafter.

Many of the features of this invention are common to both forms of the cord reel of this invention, and, of course, within the purview of this invention features of one form of the cord reel may be utilized in the other.

Further objects of this invention reside in the details of the cord reel structures and in the cooperative relationships between the component parts thereof.

Other objects and advantages of this invention will become apparent to those skilled in the art upon reference to the accompanying specification, claims and drawings in which:

FIGS. 1 to 19 illustrate one form of the cord reel structure while FIGS. 20 to 35 illustrate another form thereof;

FIG. 1 is an end elevational view of one form of the cord reel structure of this invention looking toward that portion of the hub which has the spring motor chamber therein;

FIG. 2 is an end elevational view of the opposite end of the cord reel structure looking toward that portion of the hub which has the slipring chamber;

FIG. 3 is an elevational view of the spring motor chamber end of the hub with the adjacent flange twist locked in place thereon;

FIG. 4 is an elevational view similar to FIG. 3, but illustrating the spring motor arranged in the spring motor chamber in the hub;

FIG. 5 is an elevational view similar to FIGS. 3 and 4, but illustrating the cover for the spring motor chamber twist locked into place;

FIG. 6 is a partial perspective view illustrating the manner in which the flange is twist locked to the spring motor chamber end of the hub as illustrated in FIG. 3;

FIG. 7 is a partial perspective view illustrating the manner in which the cover for the spring motor chamber is twist locked to the hub as illustrated in FIG. 5;

FIG. 8 is a perspective view of the hub looking toward the spring motor chamber end thereof and diagrammatically illustrating the spring motor mounted therein;

FIG. 9 is an elevational view of the slipring chamber end of the hub with the adjacent flange arranged in place thereon and with the electric cord locked therein;

FIG. 10 is an elevational view similar to FIG. 9 with the slipring block arranged within the slipring chamber in the hub;

FIG. 11 is an exploded perspective view of the slipring chamber end of the hub, the electric cord therein, the slipring block, and the electrical connections between the electric cord and the sliprings on the slipring block;

FIG. 12 is an elevational view of the slipring block which is arranged in the slipring chamber in the hub;

Figure 13:
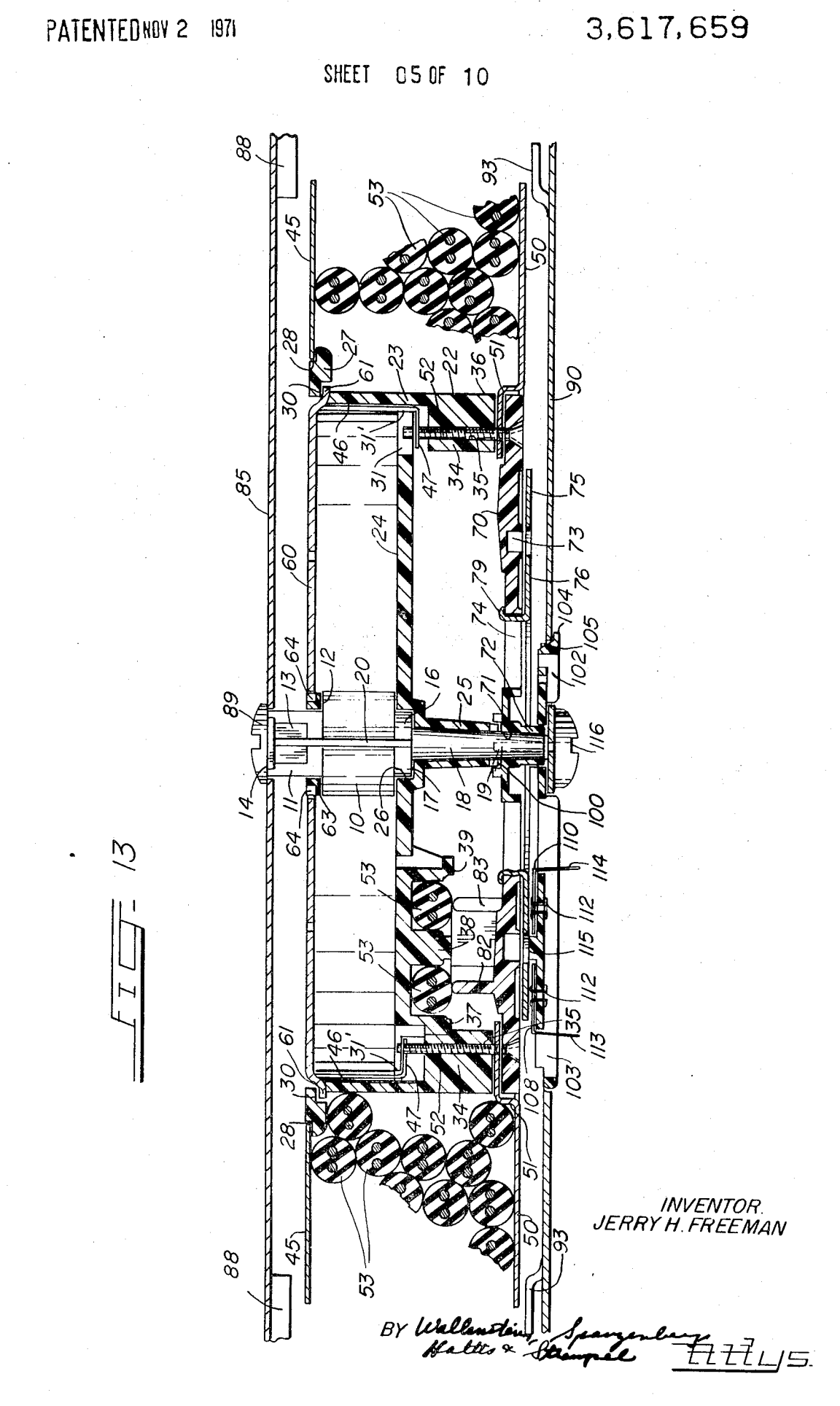

FIG. 13 is an enlarged partial sectional view through the cord reel structure taken substantially along the line 13—13 of FIG. 1;

FIGS. 14, 15 and 16 are opposite and side elevational views of the stationary pickup block associated with the slipring lock;

FIG. 17 is an exploded perspective view of the stationary arbor and the cover bearing associated therewith;

FIG. 18 is an exploded perspective view of the support members or brackets for the cord reel structure;

FIG. 19 is a perspective view of a modified support member or bracket;

FIG. 20 is an end elevational view of another form of the cord reel structure of this invention looking toward that portion of the hub which has the spring motor chamber therein;

FIG. 21 is an end elevational view of the opposite end of the cord reel structure looking toward that portion of the hub which has the slipring chamber;

FIG. 22 is a vertical sectional view through the cord reel structure taken substantially along the line 22—22 of FIG. 20;

FIG. 23 is a partial sectional view taken substantially along the line 23—23 of FIG. 22;

FIG. 24 is a partial sectional view taken substantially along the line 24—24 of FIG. 22 and showing the spiral spring operating the reel in the counterclockwise direction as illustrated by the arrow;

FIG. 24A is a partial view similar to FIG. 24 but showing a different spiral spring for operation of the cord reel in the opposite direction as indicated by the arrow;

FIG. 25 is a sectional view through the cord reel taken substantially along the line 25—25 of FIG. 22 and illustrating the pawl and ratchet mechanism within the cord reel structure when the cord reel is operated by the spiral spring in the direction indicated by the arrow;

FIG. 25A is a partial view similar to FIG. 25 but showing the pawl and ratchet arrangement when the reel is operated in the opposite direction by the spiral spring;

FIG. 26 is a sectional view taken substantially along the line 26—26 of FIG. 22 and illustrating the slipring chamber;

FIG. 27 is a sectional view taken substantially along the line 27—27 of FIG. 22 and illustrating the stationary slipring block;

FIG. 28 is a partial sectional view taken substantially along the line 28—28 of FIG. 23 and illustrating the manner of twist locking the cover for the spring motor chamber to the hub;

FIG. 29 is a partial sectional view taken substantially along the line 29—29 of FIG. 23;

FIG. 30 is a sectional view through the T-bar connection or the spiral spring taken substantially along the line 30—30 of FIG. 24;

FIG. 31 is a partial sectional view of the locking pawl arrangement and taken substantially along the line 31—31 of FIG. 25;

FIG. 32 is a sectional view taken substantially along the line 32—32 of FIG. 25 illustrating the manner of securing the two parts of the hub together;

FIG. 33 is a sectional view taken substantially along the line 33—33 of FIG. 26 illustrating the cord-locking means;

FIG. 34 is a partial elevational view of the inside of the part of the hub forming the spring motor chamber;

FIG. 35 is an inside view of the part of the hub forming the slipring chamber; and FIG. 36 is an elevational view of the spring contact block looking from the bottom of FIG. 33.

Figure 9:
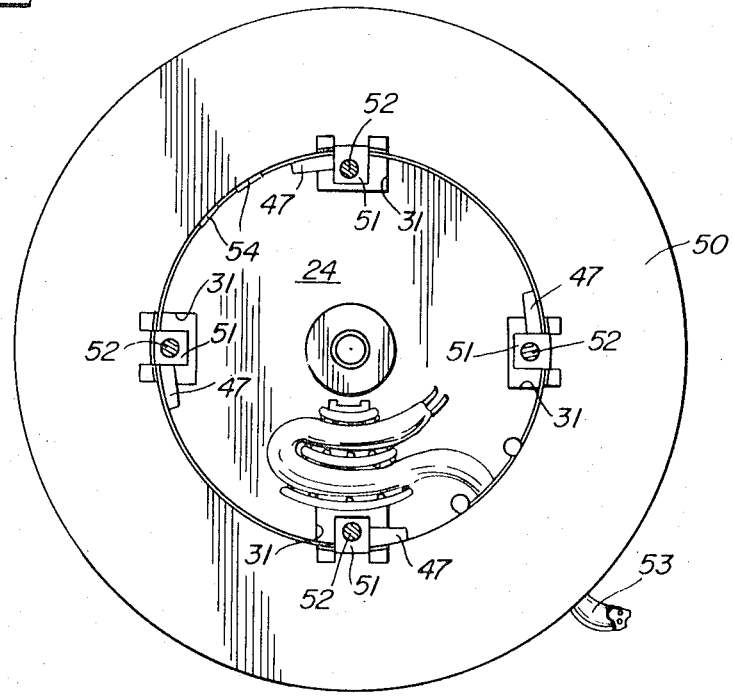
Figure 10:
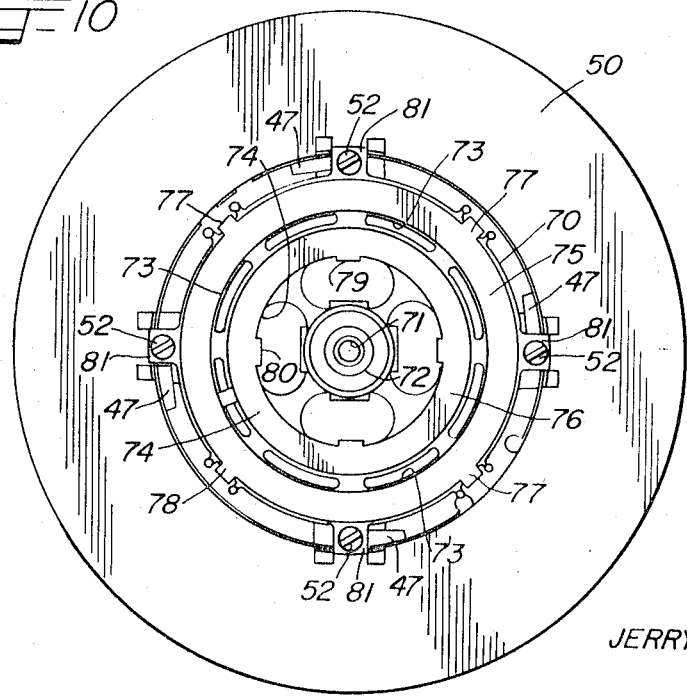

One form of the cord reel structure of this invention, illustrated in FIGS. 1 to 19, includes a stationary arbor which is shown in more detail in FIGS. 13 and 17. It is preferably made of metal, such as a zinc die casting, or it may be molded from nylon or the like if grounding is not of importance. It has a portion 10 of large diameter about which the spiral spring is arranged and a portion 11 of smaller diameter providing a shoulder 12 between the portions 10 and 11. The portion 11 and the shoulder 12 which is within the spring motor chamber form bearing surfaces for engaging and trapping a bearing 63 within a cover 60. The portion 11 is provided with a pair of flats 13 which are adapted to receive a locking collar (not shown) and a further pair of flats 14 for stationarily securing the arbor to a mounting support on bracket 85. The end of the arbor which has the flats 14 is provided with a tapped hole 15. The arbor also has a reduced portion 16 and a further tapered reduced portion 18, the portions 16 and 18 forming an annular shoulder 17 therebetween. The surfaces of the reduced portion 16 and of the further reduced portion 18 and the annular shoulder 17 provide bearing surfaces for the bearing in the hub 22. The end of the tapered reduced portion 18 is provided with a longitudinal tapped hole 19. The portions 10, 11 and 16 are provided with a radial slit 20 and the edges of the slit 20 in the enlarged portion 10 have a radius of curvature on each side of the slit for receiving the inner end of the coil spring 55 in either direction.

The cord reel structure also includes a molded synthetic plastic hub 22 which is molded from a high-temperature and flame-resistant synthetic plastic, such as polypropylene, which is identified by the name "Moplen C-040" or "Polysulfone." Such a synthetic plastic material is also resistant to the transmission of heat, forms a good bearing material and is a good electrical insulator. As shown more particularly in FIGS. 8, 11 and 13, the hub 22 had a cylindrical wall 23 and a transverse circular partition wall 24 which is arranged between the longitudinal ends of cylindrical wall 23 to provide a spring motor chamber and a slipring chamber within the hub. The center of the partition wall 24 is provided with a sleeve extension 25 and a circular recess 26 which cooperate with the portions 18, 17 and 16, respectively, of the stationary arbor as a bearing for rotatably mounting the hub 22 on the stationary arbor.

The end of the hub 22 adjacent the spring motor chamber is provided with an annular flange 27 which in turn is provided with an external annular shoulder 28. The annular flange 27 where it merges with the cylindrical wall 23 is provided with a plurality of holes 29 and communicating slots 30, four such holes and slots being illustrated. The partition wall 24 is also provided with a plurality of holes 31 and communicating slots 31', four of which are also illustrated. The inner surface of the cylindrical wall 23 within the spring motor chamber is provided with a T-bar 32 which comprises an arcuate crosspiece connected by a leg to the cylindrical wall 23. The partition wall 24 is provided with a slot 54 therethrough on each side of the leg of the T-bar 32. The other end of the cylindrical wall 23 adjacent the slipring chamber is provided with an external annular shoulder 33. The inner surface of the cylindrical wall 23 in the slipring chamber is provided with a plurality of bosses 34 having bores 35 therein, the bosses 34 and bores 35 being in longitudinal alignment with the holes 31 in the partition wall 24. The cylindrical wall 23 adjacent the bosses 34 is provided with a plurality of slots 36. The partition wall 24 is provided with a plurality of radially arranged arcuate projections 37, 38 and 39 which extend into the slipring chamber in the hub. The cylindrical wall 23 is also provided with an opening 40 therethrough communicating with the slipring chamber in the hub, the edges of this opening 40 being provided with post sections 41 for reinforcing the opening and for providing smooth surfaces for guiding the electric cord which passes therethrough.

As shown more particularly in FIGS. 3 and 6, the cord reel structure also includes an annular metal flange 45 which is received over and centered by the annular shoulder 28 on the flange 27 on the end of the hub. The metal flange 45 is heat conducting and radiating and may be formed of galvanized steel or the like. It has a plurality of inwardly and longitudinally extending arms 46 which in turn are provided with inwardly radially extending cam ears 47 which are slanted with respect to the arms. The arms 46 and the ears 47 are extended through the holes 31 in the partition wall 24 and then the flange 45 is twisted or rotated with respect to the hub 22 so as to move the arms 46 from the holes 31 into the communicating slots 31' and to move the cam ears 47 underneath the partition wall 24. Since the cam ears 47 are slanted, the flange 45 is drawn up tightly on the ends of the hub 22. The flange 45 may be provided with holes to assist in the twisting thereof. In this way, the annular flange 45 adjacent the spring motor chamber in the hub 22 is twist locked into place on the hub. As shown more particularly in FIGS. 9 and 13, the cord reel structure also includes another radially extending annular metal flange 50 which is also heat conducting and radiating and which may also be made from galvanized steel. It is arranged at the other end of the hub 22 adjacent the slipring chamber in the hub. This annular flange 50 is provided with inwardly radially extending ears which extend through the slots 36 in the cylindrical wall 23 and overlie the bosses 34 in the slipring chamber of the hub. The annular flange 50 seats on and is centered and supported by the annular shoulder 33 on the end of the cylindrical wall 23, and the flange 50 is held in place by self-threading screws 52 extending through holes in the ears 51 and through the bores 35 in the bosses 34 in which they are self-threaded and into the openings 31 in the partition 24. In this way, the annular flange 50 is securely mounted to the hub 22. Since the self-threading screws 52 extend past the cam ears 47 of the annular flange 45 in the holes 31 in the partition wall 24, untwisting and removal of the annular flange 45 is effectively prevented. The outer surface of the cylindrical wall 23 of the hub and the surfaces of the annular flanges 45 and 50 form a reel upon which the electric cord 53 is coiled. The radially extending annular metal flanges 45 and 90 operate to dissipate heat generated by the flow of current in the coiled electric cord 53 and the synthetic plastic cylindrical wall 23 operates to retard the flow of heat generated by the coiled electric cord 53 into the spring motor chamber and the slipring chamber within the hub 22.

Referring now to FIGS. 4 and 8, a spiral spring 55 is arranged in the spring motor chamber in the hub 22 and it has its inner end bent over as indicated at 56 and received in the slot 20 in the portion 10 of the stationary arbor. Since the edges of the slot 20 in the stationary arbor have a curvature to conform to the curvature in the spring 55 where it is bent over as indicated at 56, the spiral spring 55 may fit snugly about the portion 10 of the arbor, and since both sides of the slot 20 in the arbor have a curvature, the same arbor may receive a right-hand or left-hand operating spiral spring 55. The bend portion 56 of the spiral spring 55 is of less width than the remainder of the spring so as not to interfere with the bearing 63 when mounted for right-hand or left-hand operation. The outer end of the spiral spring 55 is provided with a notch 57 which is received over the T-bar 32 for anchoring that end of the spiral spring to the interior of the cylindrical wall 23 in the spring motor chamber. In this way, the inner and outer ends of the spiral spring 55 are secured to the stationary arbor and the cylindrical wall 23 of the hub 22 without the need for any extraneous fastening means. By notching the spiral spring 55 on one side or the other, the spiral spring may be made to operate in one direction or the other without any differences in the arbor or the hub. This minimizes stocking of parts for right-hand or left-hand operation. The spiral spring 55 operates to rotate the hub 22 in one direction to coil the electric cord 53 thereon between the flanges 45 and 50 but allows uncoiling of the electric cord therefrom.

A cover 60 is provided for enclosing the spiral spring 55 in the spring motor chamber within the hub 22 as shown more particularly in FIGS. 5 and 13. The cover 60 is substantially circular in configuration and may be made of sheet aluminum or the like. The cover 60 is provided with a plurality of outwardly radially extending ears 61 which are first received in the holes 29 in the hub flange 37 and which are then twisted into the communicating slots 30 to twist lock the cover 60 in place on the end of the hub 22. Where the slots 30 communicate with the holes 29, the hub flange 27 is provided with detent bumps 30' which tend to maintain the cover ears 61 in the slots 30 and prevent them from being accidentally untwisted into the holes 29. To assure that the cover ears 61 cannot be untwisted from the slots 30 into the holes 29, the cover 60 is provided with a normally upstanding tab 66 which can be bent down into one of the holes 29 after the cover 60 is twisted to the locked position. Alternatively, the hub flange 27 may be provided with a separate hole or recess other than the holes 29 into which an upstanding tab on the cover 60 may be bent for maintaining the cover in its twist locked position. As shown more particularly in FIGS. 5 and 13, the cover 60 is provided with a central hole 65 which is provided with a pair of outwardly extending radial slots 62. A bearing 63 which also may be formed from polypropylene or polysulfone or the like is received in the cover opening 65 and it is provided with an annular shoulder engaging the inside of the cover and with projections 64 for engaging in the radial slots 62. In this way, the bearing 63 is securely held in the opening 65 in the cover 60 against rotation with respect thereto. The bearing 63 engages the portion 11 and the annular shoulder 12 of the stationary arbor so as to form an additional bearing for rotatably mounting the hub 22 on the stationary arbor and also as to act as a thrust bearing. By locating the bearing 63 on the inside of the cover 60 and by reducing the width of the bent portion 56 of the spiral spring 55, the overall length of the stationary arbor and the hub 22 is maintained at a minimum.

As shown in FIGS. 2, 10, 11, 12 and 13 a circular slipring block 70 is arranged within the slipring chamber in the hub 22. This slipring block is also molded from a high-temperature and flame-resistant synthetic plastic such as polypropylene or polysulfone. It has a central opening 71 and a sleeve extension 72 for receiving the reduced portion 18 of the stationary arbor and acting as a bearing therefor, the central opening 71 also being enlarged for receiving the sleeve bearing 25 on the partition wall 24 of the hub. The slipring block 70 is also provided with a plurality of circumferentially and radially spaced arcuate slots 73 and 74 therethrough to form circular supports for sliprings 75 and 76 and to allow for ventilation of the slipring chamber in the hub to maintain the same in a cool condition.

The sliprings 75 and 76 may be made of yellow brass or the like and they are provided with tabs 77 and 79, respectively, which are crimped over the circular supports formed by the arcuate slots in the slipring block 70. The sliprings 75 and 76 are also provided with straight connector tabs 78 and 80 which extend into the slipring chamber in the hub. These connector tabs receive quick connect fittings 84 carried by the wires of the electric cord 53 in the slipring chamber. The quick connect fittings 84 allow for quick assembly and reduce the IR drop normally present in soldered connections. In this way, the wires of the electric cord 53 are effectively and reliably electrically connected to the sliprings 75 and 76.

If a three wire electric cord is to be utilized, an additional circular slipring having tabs similar to the sliprings 75 and 76 is mounted on the annular support between the arcuate slots 74 and the sleeve extension 72 on the slip ring block 70. Here, also, the electrical connection between this third slipring and the third wire in the electric cord would be made by a quick connect fitting 84 with the same beneficial results. If the electric cord 53 includes a ground wire, it is connected through a quick connect fitting, like 84, to a conductor strip which extends through one or the other of the holes 54 in the partition wall 24 and which is welded to the other notched end of the spiral spring 55, it being noted that the holes 54 are on each side of the center leg of the T-bar 32 in the spring motor chamber. As a result, the ground wire in the electric cord is directly grounded through the spiral spring 55 and the stationary arbor to the support members or brackets for the cord reel structure.

The electric cord 53 enters into the slipring chamber in the hub through the opening 40 in the cylindrical wall 23, this opening 40 being reinforced by post portions 41 which also provide a smooth guide surface for the electric cord as it passes through the opening. The electric cord 53 is received between the arcuate projections 37, 38 and 39 on the partition wall 24, it being held in an acute reverse bend about one of the projections to be locked thereby in the slipring chamber. The slipring block 70 is provided with radially outwardly extending ears 81 received in the slots 36 of the hub and having holes therein for receiving the self-tapping screws 52 for securing the slipring block 70 in place on the end of the hub 22 adjacent the slipring chambers. In this way, the slipring block 70 is secured in place by the same screws 52 which secure the metal flange 50 in place. The inner side of the slipring block 70 is provided with a plurality of arcuate projections 82 and 83 which engage the electric cord 53 where it is held by the arcuate projections 37, 38 and 39 for clamping the electric cord therebetween and assisting in the locking of the electric cord. Since the slipring block 70, in addition to being secured at its periphery by the screws 52 to the hub, is guided at its center by the bearing sleeve 25 on the partition wall of the hub, distortion of the slipring block 70 due to its clamping action on the electric cord 53 is held to a minimum.

The stationary arbor of the cord reel structure is supported by a pair of supporting members such as the supporting brackets 85 and 90 illustrated more clearly in FIGS. 1, 2, 13 and 18. The support bracket 85 is substantially flat and it is provided with a central elongated hole 86 for receiving the flats 14 on the reduced portion 11 of the arbor. A screw 89 received in the tapped hole 15 in the arbor securely fastens the end of the arbor to the support bracket 85. The support bracket 85 also has mounting holes 87 adjacent its ends. The support bracket may further be provided with inwardly extending ears 88 which are located adjacent the periphery of the annular flange 45 to prevent the electric cord from being caught between the flange and the supporting bracket.

The other supporting bracket 90 has a pair of offset legs 91 at its ends which engage the ends of the supporting bracket 85. The legs 91 are also provided with a pair of inwardly extruded holes 92, the extruded portions of which enter the holes 87 in the supporting bracket 85 to assure proper alignment between the brackets. Self-threading screws 99 extend through the holes 87 and are self-threaded in the holes 92 for securing the supporting brackets together. The supporting bracket 90 also has inwardly bent portions 93 which are located adjacent the periphery of the annular flange 50 to prevent the electric cord 53 from being caught between that flange and the supporting bracket. The supporting bracket 90 also has a central hole 94 in alignment with the tapped hole 19 in the reduced portion 18 of the arbor and a screw 116 extending through the hole 94 into the tapped hole 19 secures the reduced portion 18 of the arbor to the supporting bracket 90.

The supporting bracket 19 is provided with openings 95 and 96 on opposite sides of the central hole 94, the opening 96 having a notch extension 97. A pickup block 100, shown more particularly in FIGS. 14, 15 and 16, has a hole 101 and a pair of projecting portions 102 and 103. The pickup block 100 may also be molded from a suitable synthetic plastic, such as polypropylene or polysulfone or the like. It is arranged on the inner side of the supporting bracket 90 with the projecting portion 102 first inserted through the opening 96 and then the projecting portion 103 inserted through the opening 95 in the supporting brackets. The hole 101 in the pickup block 100 receives the sleeve projection 72 on the slipring block 70 to assure proper alignment between the pickup block and the slipring block.

The projecting portion 102 is provided with an overhanging ear 104 with a tapered rib 105, the ear overlying the outer side of the supporting bracket 90 with the tapered rib 105 received within the notch 97 in the supporting bracket. This prevents this end of the pickup block 100 from tilting inwardly through the opening 96 which might be occasioned by the spring contact pressure brought about by the spring contacts engaging the sliprings. The pickup block 100 adjacent the projecting portion 103 is provided with a pair of bosses 106 which engage the inner side of the supporting bracket 90 adjacent the opening 95 to prevent this end of the pickup block from tilting outwardly through the opening 95. The sides of the pickup block 100 are also provided with a plurality of friction ribs 107 which engage the edges of the openings 95 and 96 in the supporting bracket 90 to frictionally hold the pickup block 100 in place in the supporting bracket during assembly.

A pair of arcuate leaf springs 108 and 110, each having a pair of contacts 109 and 111 at their ends contacting respectively the sliprings 75 and 76, at their centers are riveted by eyelets 112 to the pickup block 100. The leaf springs 109 and 111 may be made of phosphor bronze or the like and they each have a connector tab 113 and 114, respectively, extending outwardly through openings in the pickup block 100. Lead wires leading to the electrical equipment to be electrically energized are welded to the connector tabs 113 and 114, thereby eliminating the IR loss which occurs in the case of the usual soldered connections. In this way, the wires of the electric cord 53 are electrically connected to the lead wires for the electrical equipment without the interposition of soldered connections. The pickup block 100 is provided between the leaf springs 108 and 110 with a projection 115 which prevents rotation of the leaf springs 108 and 110 about their fastening eyelets 112 and maintains the contacts 109 and 111 thereon in alignment with the sliprings 75 and 76 which they contact. Where the electric cord 53 is a three wire cord and the slipring block 70 is provided with the additional slipring as expressed above, an additional spring contact like those described above may be secured to the opposite end of the pickup block 100. In this connection, the spring contact may be riveted to the pickup block 100 by an eyelet passing through a hole 117 in the pickup block and the connecting tab for the spring contact may extend through the adjacent opening in the pickup block. A third lead wire for the electrical equipment may be welded to this connecting tab.

A modified form of the supporting bracket 90 is illustrated in FIG. 19 wherein like reference characters have been utilized for like parts. Here, the offset legs of the modified supporting bracket 120 are provided with radially inwardly extending portions 121 adjacent the peripheries of the annular flanges 45 and 50 to prevent the electric cord from being caught between those flanges and the supporting brackets 85 and 120. Where the modified supporting bracket 120 is utilized, the bent portions 88 on the supporting bracket 85 may be dispensed with.

Referring now to the other form of the coil structure of this invention illustrated in FIGS. 20 to 35, it includes a stationary arbor which is shown in more detail in FIG. 22. It is preferably made of metal, such as a zinc die casting, or it may be molded from nylon or the like if grounding is not of importance. It has a portion 130 of large diameter about which the spiral spring is arranged and a portion 131 of smaller diameter providing a shoulder 132 between the portions 130 and 131. The portion 131 and the shoulder 132 which is within the spring motor chamber form bearing surfaces for engaging a bearing 203 in a cover 199. The portion 131 is provided with a pair of flats 133 for stationarily securing the arbor to a mounting support or bracket 240. The end of the arbor which has the flats 133 is provided with a tapped hole 134. The arbor also has a reduced portion 135 which is tapered as illustrated, the juncture of the portions 130 and 135 forming a shoulder 136. The surface of the reduced portion 135 and the annular shoulder 136 provide bearing surfaces for the bearing in the hub. The tapered portion 135 of the arbor is also provided with flats 137 and at its end it is further provided with flats 138. This end of the arbor is also provided with a tapped hole 139. The portions 130, 131 and 135 are provided with a radial slit 140 and the edges of the slit in the enlarged portion 130 have a radius of curvature on each side of the slit for receiving the inner end 186 of the spiral spring in either direction.

The cord reel of this other form of the invention is a two-part reel having a first part 145 which includes the spring motor chamber and a second part 146 which includes the slipring chamber. These parts 145 and 146 are molded from a high-temperature and flame-resistant synthetic plastic such as polypropylene, which is identified by the name "Moplen C–040"or "Polysulfone", or such as Nylon, or the like. Such a synthetic plastic material is also resistant to the transmission of heat, forms a good bearing material and is a good electrical insulator.

The first part 145 includes a cylindrical wall 147, an integral circular radially arranged wall 148 at the inner end of the cylindrical wall 147, and an integral annular flange 149 extending radially from the outer end of the cylindrical wall. This annular flange includes a flange portion 150 and spokes 151 extending radially outwardly to a rim 152. The circular wall 148 is provided with a central opening 153 and an annular bearing extension 154 which engage the reduced portion 137 and the shoulder 136 of the arbor for rotation purposes.

Referring more particularly to FIGS. 22 and 34, the circular wall 148 of the first part 145 has a plurality of bosses 156 provided with holes 157 and also an integral key 158 adjacent one of the bosses 156. The circular wall 148 also includes a plurality of posts 159 having reduced diameter extensions 160. The circular wall 148 further has a plurality of pins 161 and 162 extending therefrom and it also has a shallow cavity 163 between the respective pairs of pins 161 and 162. The circular wall 148 also includes an annular shouldered extension 164.

The other or second part 146 of the cord reel or hub has a cylindrical wall 168, an integral circular radially arranged wall 169 at the inner end of the cylindrical wall 168, and an integral annular flange 170 extending radially from the outer end of the cylindrical wall 168. This annular flange has a flange portion 171 and a plurality of spokes 170 extending radially therefrom and terminating in a rim 173. The circular wall 169 has a central opening and a sleeve extension 175 extending into the slipring chamber, and terminating in a bearing surface 176. The sleeve extension 175 engages with the tapered portion 135 of the arbor so as to provide for rotation therebetween.

Referring more particularly to FIGS. 22 and 35, the circular wall 169 of the second part 146 has a plurality of chamfered holes 177 which are adapted to receive the extensions 160 on the posts 159 of the part 145. The circular wall 169 also includes a plurality of holes 178 which overlie the holes 157 in the bosses 156 of the first part 145. The circular wall 169 also includes a chamfered notch 179 for receiving the key 158 of the first part 145. The circular wall 169 also includes a plurality of chamfered holes 180 for receiving the pins 161 and 162 of the first part 145 and, here also, the circular wall 169 is provided with shallow recesses 181 between the holes 180. The circular wall 169 is also provided with an annular shouldered extension 182 which is adapted to mesh with the annular shouldered extension 164 on the first part 145.

The two parts 145 and 146 are assembled into the hub or reel by interengaging the shouldered annular extensions 164 and 182, with the key 158 in the notch 179, with the reduced diameter extensions 160 in the holes 177, with the pins 161 and 162 in the holes 180 and with the circular wall 169 engaging the bosses 156 and the enlarged portions of the posts 159. Rivets or eyelets 183 (as shown more particularly in FIG. 32) are inserted through the holes 157 and 178 to secure the parts together. The interaction of the annular shouldered extensions and the pins with respect to the holes and the key with respect to the notch both concentrically fixes and annularly fixes the positions of the two parts 145 and 146 to provide the hub and cord reel. The interlocking shouldered extensions 164 and 182, the bosses 156 and the large diameter portions of the posts 159 provide a space between the circular walls 148 and 169 of the first and second parts 145 and 146 for accommodating a pawl and ratchet arrangement as will be pointed out more fully hereafter.

Referring now more particularly to FIGS. 22 and 24, a spiral spring 185 is arranged in the spring motor chamber in the first part 145 of the hub and it has its inner end bent over as indicated at 186 and received in the slot 140 in the enlarged portion 130 of the stationary arbor. Since the edges of the slot 140 in the enlarged portion 130 of the arbor have a curvature to conform to the curvature of the spring 185 where it is bent over as indicated at 186, the spiral spring 185 may fit snugly about the portion 130 of the arbor, and since both sides of the slot 140 in the arbor have a curvature, the same arbor may receive a right-hand or left-hand operating spiral spring 185. The bent portion 186 of the spiral spring 185 is of less width than the remainder of the spring so as not to interfere with the bearings 154 and 203 when mounted for right-hand or left-hand operation. The outer end of the spiral spring 185 as shown more clearly in FIGS. 24 and 30 is provided with a notch 187 in one edge thereof which is received over a T-bar 188 for anchoring that end of the spiral spring to the interior of the cylindrical wall 148 in the spring motor chamber. In this connection, the T-bar has a cross piece 189 and a leg 190 which is integral with the circular wall 148 and the cylindrical wall 145. The notch 187 is received over the leg 190 of the T-bar with the outer end of the spiral spring 185 between the crosspiece 189 and the cylindrical wall 145. The spiral spring 185 may be so inserted over the T-bar 188 from the outer open end of the spring motor chamber. By notching the spiral spring 185 on one side or the other, the spiral spring 185 may be made to operate in one direction or the other without any differences in the arbor or the hub. This minimizes stocking of parts for right-hand or left-hand operation. As shown in FIG. 24, the spiral spring is arranged to rotate the reel in the counterclockwise direction as indicated by the arrow for the purpose of winding the electric cord thereon, the unwinding of the spiral spring 185 causing the winding of the cord on the reel. When the cord is pulled from the reel against the action of the spiral spring 185, the reel is rotated in the opposite direction and the spiral spring 185 is wound upon itself. In FIG. 24A, the reverse operation is shown wherein the spiral spring 185 rotates the reel in the opposite direction as indicated by the arrow to wind the electric cord on the reel.

As shown more clearly in FIGS. 22, 23, 28 and 29, the cylindrical wall 147 is provided with a plurality of slots 195 adjacent the flange 150, there being provided by way of illustration four such slots. Adjacent these slots 195 the flange 150 is provided with a wide opening 196 and a communicating narrow opening 197, the flange 150 having a detent projection 198 on its underside between these openings 196 and 197. A cover 199, which is also preferably made of a synthetic plastic material, has a plurality of radially extending and downwardly offset ears 200. The ears 200 are adapted to be inserted through the openings 196 in the flange 150 into the slot 195 in the cylindrical wall 147. When the cover 199 is rotated from this position, the ears are moved along the slot 195 into the opening 197 below the flange 150 so as to be twist locked in place on the part 145 for enclosing the spring motor chamber in the part 145. After the ears 200 are so moved to this locking position the detent projection 198 on the bottom of the flange locks the cover 199 in this position. In this respect the detent projection 198 is so arranged that it engages flush with the edge of the ear 200 so as to maintain the cover 199 in its twist locked condition. Preferably, the ears 200 are tapered along one edge as indicated in FIG. 28 so that the ears may be readily rotated to the locked position. The cover 199 has a bearing portion 203 integral therewith which has a central opening 202 for receiving the portion 131 of the arbor. The bearing portion 203 engages the reduced portion 131 of the arbor and the shoulder 132 of the arbor to provide a bearing surface for rotation of the reel with respect to the arbor.

The hub or reel including the cylindrical walls 148 and 168 and the radially extending flanges 149 and 170 operates to receive an electric cord 205 thereon, the electric cord 205 being wound upon the reel. The free end of the electric cord 205 may be provided with a suitable electric fitting, such as, for example, a plug 206. The inner end of the electric cord 205 wound upon the reel passes through an opening in the cylindrical wall 168 of the second part 146 into the slipring chamber therein, the opening being provided with post portions 207 (as illustrated in FIG. 26) for guiding the electric cord 205 and for strengthening the edges of the opening in the cylindrical wall 168. The circular wall 169 of the second part 146 of the hub is provided with a plurality of arcuate projections 208 for receiving the electric cord 205, the electric cord being arranged between these projections 208 in a reverse bend for anchoring the electric cord within the slipring chamber of the second part 146 of the hub or reel.

As shown more clearly in FIGS. 26 and 33, the sleeve extension bearing 175 of the second part 146 is provided with a notch 210 therealong which terminates in a shoulder 211 adjacent the outer end of the sleeve extension. The circular wall 169 of the second part 146 is provided with a boss 212 between the cylindrical wall 168 and the outermost projection 208, this boss being provided with a central hole. A spring contact block 213 is adapted to overlie the arcuate projections 208 and it is provided with an inner ear 214 engageable in the slot 210 against the slot shoulder 211 and also with an outermost ear 215 adapted to overlie the boss 212. Thus, the innermost end of the spring contact block 213 is anchored in the slot 210 against the shoulder 211 and the outermost end of the spring contact block 213 is secured to the boss 212 by a screw 216 extending through a hole in the ear 215 and threaded in the hole in the boss 212. The contact block 213, therefore, operates to secure the reverse bends of the cord 205 between the arcuate projections 208.

A pair of arcuate leaf springs 220 and 221 are eyeleted to the underside of the spring contact block 213 by eyelets 223, the block having shoulders 224 which are engaged by the arcuate leaf springs to prevent rotation of the leaf springs about the eyelets. Each of the leaf springs has a tab 222 to which the leads of the electric cord 205 are spot welded. The ends of the leaf springs 220 and 221 are provided with contacts for engaging slipring contacts as will be pointed out hereafter.

A circular slipring block 225 is stationarily mounted with respect to the slipring chamber of the reel and it is provided with a plurality of overhanging ears 226 and a plurality of overhanging ears 227. The slipring block 225 also has a central elongated opening 228 to receive the reduced diameter portion 135 of the arbor and its flats 137 as shown more clearly in FIG. 27. Thus, the slipring block 225 is held against rotation with respect to the arbor portion 135 by these flats 137.

A first slipring contact 230 has a plurality of ears 231 which are received under the overhanging ears 226 upon rotation of the slipring contact 230 with respect to the slipring block 225. The slipring contact 230 is also guided into proper position on the slipring block 225 by a plurality of teats 233 molded into the slipring block 225. The slipring contact 230 also has a tab 232 which is available through a slot in the slipring block 225 for making electrical connection to the slipring contact 230. A second slipring contact 235 is also provided with ears 236 which are received under the overhanging ears 227 of the slipring block 225 when this slipring contact is twisted into place. The slipring contact 235 also includes a tab 237 which is made available through a slot in the slipring block 225 for making electrical connection therethrough. Electric leads 238 are spot welded to the tabs 232 and 237.

Referring more particularly to FIGS. 20 and 22, the cord reel structure includes a bracket or support 240 adjacent the spring motor portion of the reel, the bracket 240 having an elongated opening 241 therein which receives the flat 133 on the arbor. A screw 242 threaded into the tapered hole 202 on the arbor secures the arbor to the bracket 240 and due to the interaction of the flats 133 on the arbor and elongated hole 241 in the bracket 240 rotation of the arbor with respect to the bracket 240 is prevented. The ends of the bracket 240 are provided with holes 243 for mounting purposes.

Referring now to FIGS. 21 and 22, there is also provided a second bracket 245 which has a central elongated hole 246 for receiving the flats 138 on the other end of the arbor. A screw 247 threaded into the tapped hole 227 in the arbor secures the arbor and the bracket 245 together and because of the interengagement of the elongated hole 246 and the flats 138 relative rotation of the bracket 245 and the arbor is prevented. The ends of the bracket 245 are provided with holes 248 which overlie the holes 243 in the bracket 240 and suitable means such as screws, rivets or the like may be utilized for securing the brackets 245 and 242 together and to a support upon which the cord reel structure is to be mounted. The bracket 245 is generally U-shaped and overlies the cord reel. It is provided with radially inwardly extending portions 249 adjacent the peripheries of the annular flanges 149 and 170 to prevent the electric cord from being caught between those flanges and the supporting brackets 240 and 245.

The stationary slipring block 225 is provided with a pair of ears 251 which are secured by rivets 252 to the bracket or support 245 and the bracket 245 is provided with a pair of grommets 253 through which the leads 238 leading from the slipring contacts 230 and 238 extend.

As expressed above, the space between the circular walls 148 and 169 of the parts 145 and 146 of the hub is for the purpose of accommodating a pawl and ratchet arrangement, if desired, to releasably prevent winding of the electric cord on the cord reel by the spiral spring 185. This pawl and ratchet arrangement is shown in more detail in FIGS. 25 and 31. The ratchet includes a ratchet wheel 260 which has a central elongated opening which is received over the portion 135 of the arbor having the flats 137 so that the ratchet wheel 260 is fixed against rotation on the arbor. The ratchet wheel has a pair of notches 261 and as illustrated in FIG. 25, the counterclockwise edges of these notches 261 are substantially radially disposed while the other edges thereof are at an open angle. This is the position of the ratchet wheel 260 wherein the spiral spring operates to rotate the reel in a counterclockwise direction as shown by the arrow to wind the cord on the reel. In other words, the arrangement of FIG. 25 corresponds in direction of rotation with that of FIG. 24. A pawl 262 having an elongated slot 263 is pivotally and slidably mounted on the post 159 and the pawl has a projection which is adapted to be received in one or the other of the notches 261 in the ratchet wheel 260. The pawl 262 is provided with a hook extension 264 and a spring 265 extends between this hook extension 264 and the associated pin 162, the spring 265 operating to urge the pawl 262 towards the ratchet wheel 260. With the pawl in the position illustrated in FIG. 25, counterclockwise rotation of the wheel in the direction indicated by the arrow is prevented. However, if the reel is rotated in the opposite direction by pulling the cord from the reel, the projection on the pawl 262 is moved out of the notch 261 and if the reel is then allowed to rotate rapidly in the direction indicated by the arrow, there is insufficient time for the projection on the pawl to reenter the notch 261 and thus the cord may be then wound upon the reel by the action of the spiral spring. The pawl 262 may be mounted in various positions in the hub as desired and such other positions are illustrated in dotted lines in FIG. 25. The elongated slot 263 in the pawl 262 allows pivoting of the pawl 262 about a point where its projection engages in the notch 261 so as to provide a more firm locking action between the pawl 262 and the ratchet wheel 260.

If the reel is to be rotated in the opposite direction by the coil spring such as the direction shown by the arrows in FIGS. 24A and 25A, it is necessary that the ratchet wheel 260 be turned over upon itself with respect to the arbor 135 and it is also necessary to reverse the position of the pawl 262. These reversed positions are illustrated in FIG. 25A. Any one of the pawl positions may be utilized and to show the versatility of the pawl and ratchet arrangement of this invention, the pawl is positioned in the left-hand position of FIG. 25A as distinguished from the right-hand position in FIG. 25. Here, the spring 265 is arranged between the hook extension 264 of the pawl and the associated pin 161 as distinguished from the pin 162 in FIG. 25. Here, the spring 265 also urges the pawl 262 against the ratchet wheel 260 and since the ratchet wheel 260 has been turned over upon itself the projection on the pawl 262 engages the substantially radial edge of the slot 261 so as to releasably prevent rotation of the reel in the clockwise direction by the spiral spring when it is arranged as illustrated in FIG. 24A. The operation of the pawl and ratchet mechanism in the position illustrated in FIG. 25A is the same as that illustrated in FIG. 25 and, therefore, a further description is not considered necessary. The only difference between the arrangements of FIGS. 24A and 25A and FIGS. 24 and 25 is the direction of rotation of the reel by the spiral spring.

While for purposes of illustration two forms of this invention have been disclosed, other forms thereof may become apparent to those skilled in the art upon reference to this disclosure and, therefore, this invention is to be limited only by the scope of the appended claims.

I claim:

1. A cord reel structure for an electric cord comprising a stationary arbor, a single-piece molded high-temperature and flame-resistant synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, a separate annular flange secured to and extending radially from each end of the hub and cooperating with the cylindrical wall of the hub to form a reel for receiving the electric cord coiled thereon, a spiral spring arranged in the spring motor chamber having one end connected to the arbor and the other end connected to the interior of the cylindrical wall of the hub for rotating the hub in one direction to coil the electric cord thereon between the flanges but allowing uncoiling of the electric cord therefrom, a separate cover secured to one end of the hub for enclosing the spring motor chamber in the hub and having a central hole for accommodating the stationary arbor, a separate circular slipring block arranged in the slipring chamber in the hub and secured to the other end of the hub and carrying outwardly facing circular sliprings and having a central opening for accommodating the stationary arbor, and a stationary pickup block having spring contacts engaging the outwardly facing circular sliprings.

2. A cord reel structure for an electric cord comprising a stationary arbor, a molded high-temperature and flame-resistant synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, an annular flange extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a first electrical connector block mounted in the slipring chamber in the hub for rotation therewith, a second electrical connector block stationarily mounted adjacent the first electrical connector block, one of said electrical connector blocks having circular slipring contacts, and the other of said electrical connector blocks having spring contacts engaging the slipring contacts, said radially extending annular flanges being metal flanges secured to the ends of the hub, said metal flanges and said synthetic plastic hub dissipating and retarding the flow of heat generated by the coiled electric cord into the interior of the hub.

3. A cord reel structure as defined in claim 2 wherein the ends of said hub have annular shoulders for accurately seating said radially extending annular flanges.

4. A cord reel structure as defined in claim 2 wherein the circular partition wall in the hub has a plurality of circumferentially arranged holes with communicating slots, and the annular flange adjacent the spring motor chamber in the hub has a plurality of inwardly longitudinally extending arms having inwardly radially extending and slanting cam ears receivable through said holes and movable into said slots for twist locking said annular flange in place on said end of the hub.

5. A cord reel structure as defined in claim 4 wherein the interior of the cylindrical wall in the slip ring chamber in the hub has a plurality of bosses having bores extending longitudinally therethrough in alignment with the plurality of holes in the partition, the annular flange adjacent the slip ring chamber has a plurality of inwardly radially extending ears overlying said bosses, and self-threading screws extending through said ears and the bores in said bosses and into the holes in said partition for securing said annular flange adjacent the slip ring chamber in place on the hub and preventing untwisting and hence unlocking of the annular flange adjacent the spring motor chamber.

6. A cord reel structure as defined in claim 2 wherein the interior of the cylindrical wall in the slip ring chamber in the hub has a plurality of bosses having bores extending longitudinally therethrough, the annular flange adjacent the slip ring chamber has a plurality of inwardly radially extending ears overlying said bosses, and self-threading screws extending through said ears and the bores in said bosses for securing said annular flange in place on said end of the hub.

7. A cord reel structure as defined in claim 6 wherein the first electrical connector block is a circular slip ring block having the circular slipring contacts and having a plurality of outwardly extending ears overlying the inwardly extending ears on the annular flange, and the self threading screws also extend through the ears on the slipring block for also securing the slipring block in place on said end of the hub.

8. A cord reel structure for an electric cord comprising a stationary arbor, a molded high-temperature and flame-resistant synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, an annular flange extending radially from each end of the hub and cooperating with the cylindrical wall of the hub or form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a first electrical connector block mounted in the slipring chamber in the hub for rotation therewith, a second electrical connector block stationarily mounted adjacent the first electrical connector block, one of said electrical connector blocks having circular slipring contacts, and the other of said electrical connector blocks having spring contacts engaging the slipring contacts, the inner surface of the cylindrical wall in the spring motor chamber having an integral T-bar extending radially inwardly therefrom with the cross piece of the T-bar spaced radially inwardly from the cylindrical wall by the stem piece of the T-bar and with the side of the T-bar exposed longitudinally from the end of the hub, the spiral spring being ribbon shaped and having a notch in the inner edge thereof adjacent the outer end thereof which is received over the stem piece of the T-bar from the end of the hub with the spiral spring adjacent the notch between the cross piece of the T-bar and the inner surface of the cylindrical wall of the hub for securing the outer end of the spiral spring to the hub.

9. A cord reel structure as defined in claim 8 wherein the portion of the stationary arbor within the spring motor chamber in the hub has a radial slit therein merging through curvatures on each side of the slit with the outer surface of the arbor, and the inner end of the spiral spring is bent through a curvature into a substantially straight radially inwardly extending leg which is received in the radial slit in the stationary arbor for securing the inner end of the spiral spring to the arbor, the curvatures on opposite sides of the slit in the stationary arbor providing for the use of either left-hand or right-hand operating spiral springs.

10. A cord reel structure for an electric cord comprising a stationary arbor, a molded high-temperature and flame-resistance synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, an annular flange extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a first electrical connector block mounted in the slipring chamber in the hub for rotation therewith, a second electrical connector block stationarily mounted adjacent the first electrical connector block, one of said electrical connector blocks having circular slipring contacts, and the other of said electrical connectors blocks having spring contacts engaging the slipring contacts, the portion of the stationary arbor within the spring motor chamber in the hub having a radial slit therein merging through curvatures on each side of the slit with the outer surface of the arbor, and the inner end of the spiral spring being bent through a curvature into a substantially straight radially inwardly extending leg which is received in the radial slit in the stationary arbor for securing the inner end of the spiral spring to the arbor, the curvatures on opposite sides of the slit in the stationary arbor providing for the use of either left-hand or right-hand operating spiral springs, and the width of the spiral spring where it is received in the notch in the stationary arbor being less than the width of the remainder thereof.

11. A cord reel structure for an electrical cord comprising a stationary arbor, a molded high-temperature and flame-resistant synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, an annular flange extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a first electrical connector block mounted in the slipring chamber in the hub for rotation therewith, a second electrical connector block stationarily mounted adjacent the first electrical connector block, one of said electrical connector blocks having circular slipring contacts, and the other of said electrical connector blocks having spring contacts engaging the slipring contacts, a cover secured to the spring motor chamber end of the hub for enclosing the spring motor chamber in the hub and having a central hole for accommodating the stationary arbor and a bearing for the stationary arbor.

12. A cord reel structure as defined in claim 11 wherein a portion of the stationary arbor within the spring motor chamber adjacent the cover is provided with an outwardly facing annular shoulder, and the bearing on the cover engages the circumference of the stationary arbor where it passes through the cover and also the annular shoulder on the stationary arbor.

13. A cord reel structure as defined in claim 11 wherein the central opening in the cover is provided with radially disposed notches, and the bearing for the stationary arbor is provided with projections received within said notches for locking rotation of said bearing with respect to said cover.

14. A cord reel structure as defined in claim 11 wherein the end of the cylindrical wall of the hub adjacent the spring motor chamber within the hub is provided with a radially outwardly extending annular extension, said radially outwardly extending annular extension having a plurality of circumferentially arranged holes with communicating slots, and the cover has a plurality of outwardly radially extending ears receivable through said holes and movable into said slots for twist locking said cover in place on said end of the hub.

15. A cord reel structure as defined in claim 14 wherein said annular extension has detent projections between said holes and slots for retarding reverse movement of the ears on the cover and hence untwisting of the cover.

16. A cord reel structure as defined in claim 14 wherein said cover has an additional tab which is bent inwardly into a hole in said annular extension to prevent reverse movement of the ears on the cover and hence untwisting of the cover.

17. A cord reel structure for an electric cord comprising a stationary arbor, a molded high-temperature and flame-resistant synthetic plastic hollow hub rotatably mounted on said arbor and including a cylindrical wall and a circular radially arranged partition wall intermediate the ends of the hub and forming a spring motor chamber and a slipring chamber within the hub and a central bearing in the partition wall for rotatably mounting the hub on the arbor, an annular flange extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a first electrical connector block mounted in the slipring chamber in the hub for rotation therewith, a second electrical connector block stationarily mounted adjacent the first electrical connector block, one of said electrical connector blocks having circular slipring contacts, and the other of said electrical connector blocks having spring contacts engaging the slipring contacts, the central bearing in the partition wall of the hub including an elongated sleeve extending from the partition wall into the slipring chamber to provide longitudinally extended bearing surfaces for rotatably mounting the hub on the stationary arbor.

18. A cord reel structure as defined in claim 17 wherein the first electrical connector block mounted in the hub is a circular slipring block having the circular slipring contacts and having a central opening for accommodating the stationary arbor and also receiving the end of the elongated bearing sleeve to minimize distortion of the slipring block and assure proper centering thereof.

19. A cord reel structure for an electric cord comprising a stationary arbor, a molded high-temperature and flame-resistant synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, an annular flange extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a first electrical connector block mounted in the slipring chamber in the hub for rotation therewith, a second electrical connector block stationarily mounted adjacent the first electrical connector block, one of said electrical connector blocks having circular slipring contacts, and the other of said electrical connector blocks having spring contacts engaging the slipring contacts, the cylindrical wall of the hub being provided with an opening extending therethrough into the slipring chamber in the hub for directing the electric cord into the slipring chamber, and the partition wall in the hub having a plurality of radially spaced circumferentially extending arcuate projections extending into the slipring chamber in the hub for receiving and maintaining therebetween the electric cord in acute reverse bend configuration about one of said projections to lock the electric cord in the slipring chamber.

20. A cord reel structure as defined in claim 19 wherein said first electrical connector block mounted in the slipring chamber holds the electric cord between the arcuate projections on the partition wall.

21. A cord reel structure as defined in claim 19 wherein the edges of the opening in the cylindrical wall of the hub have substantially cylindrical posts for strengthening the opening and guiding the electric cord through the opening.

22. A cord reel structure for an electric cord comprising a stationary arbor, a single-piece molded high-temperature and flame-resistant synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, an annular flange extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a separate first electrical connector block mounted in the slipring chamber in the hub for rotation therewith, a separate second electrical connector block stationarily mounted adjacent the first electrical connector block, one of said electrical connector blocks having circular slipring contacts, and the other of said electrical connector blocks having spring contacts engaging the slipring contacts, at least one of said radially extending annular flanges being a metal flange secured to an end of the hub, said at least one metal flange and said synthetic plastic hub dissipating and retarding the flow of heat generated by the coiled electric cord into the interior of the hub.

23. A cord reel structure for an electric cord comprising a stationary arbor, a molded high-temperature and flame-resistant synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, an annular flange extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a circular slipring block mounted in the slipring chamber in the hub and carrying circular slipring contacts, a stationarily mounted pickup block carrying spring contacts engaging the circular slipring contacts, the circular slipring block being provided with a plurality of radially and circumferentially spaced slots therethrough and circular supports for the circular slipring contacts, the circular slipring contacts which are supported by the circular supports of the slipring block being provided with a plurality of tabs which extend through the slots and are crimped over to secure the circular slipring contacts in place on the slipring block, said plurality of radially and circumferentially spaced slots through the slipring block being elongated arcuate slots to provide air passages communicating with the interior of the slipring chamber in the hub for cooling the same.

24. A cord reel structure for an electric cord comprising a stationary arbor, a molded high-temperature and flame-resistant synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, an annular flange extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a circular slipring block mounted in the slipring chamber in the hub and carrying circular slipring contacts, a stationarily mounted pickup block carrying spring contacts engaging the circular slipring contacts, the circular slipring block being provided with a plurality of radially and circumferentially spaced slots therethrough and circular supports for the circular slipring contacts, the circular slipring contacts which are supported by the circular supports of the slipring block being provided with a plurality of tabs which extend through the slots and are crimped over to secure the circular slip ring contacts in place on the slipring block, said slipring contacts also having straight connector tabs extending through the slipring block, and said electric cord in the slip ring chamber in the hub having quick connect fittings receiving the connector tabs for making electrical connections between the electric cord and the slipring contacts.

25. A cord reel structure for an electric cord comprising a stationary arbor, a molded high-temperature and flame-resistant synthetic plastic hollow hub rotatably mounted on said arbor and including a cylindrical wall, a circular radially arranged partition wall intermediate the ends of the hub and forming a spring motor chamber and slipring chamber within the hub, and a control bearing in the partition wall for rotatably mounting the hub on the arbor, an annular flange extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a circular slipring block mounted in the slipring chamber in the hub and carrying circular slip ring contacts, a stationarily mounted pickup block carrying spring contacts engaging the circular slipring contacts, a first support member, means for securing the end of the stationary arbor adjacent the spring motor chamber in the hub to the first support, a second support member adjacent the slipring chamber in the hub and having a central hole in alignment with the stationary arbor and an opening on each side thereof, said stationary pickup block having said spring contacts being on the inside of the second support member and including portions projecting from the inside out through the openings on each side of the central hole in the second support member and including an opening in alignment with the central hole in the second support member, tabs on the stationary pickup block engaging the inside of the second support member adjacent one of the openings and engaging the outside of the second support member adjacent the other opening for positioning the stationary pickup block in the second support member, and a screw extending through the central hole in the second support member for securing the end of the stationary arbor adjacent the slipring chamber in the hub to the second support member.

26. A cord reel structure as defined in claim 25 wherein said projecting portions of the stationary pickup block have friction ribs engaging the openings in the second support member.

27. A cord reel structure as defined in claim 25 wherein the central opening in the slipring block for receiving the stationary arbor is provided with a sleeve extension and forms a bearing for the stationary arbor, and the opening in the stationary pickup block in alignment with the central hole in the second support member receives the sleeve extension of the slipring block.

28. A cord reel structure for an electric cord comprising a stationary arbor, a molded high-temperature and flame-resistant synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, an annular flange extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a first electrical connector block mounted in the slipring chamber in the hub for rotation therewith, a second electrical connector block stationarily mounted adjacent the first electrical connector block, one of said electrical connector blocks having circular slipring contacts, and the other of said electrical connector blocks having spring contacts engaging the slipring contacts, a pair elongated support brackets which extend along the ends of the cord reel structure and beyond the diameters of the flanges and to which the ends of the stationary arbor are secured, and at least one of the brackets being provided with projections adjacent the circumferences of the flanges to prevent the electric cord from being caught between the flanges and the brackets.

29. A cord reel structure for an electric cord comprising a stationary arbor, a single-piece molded high-temperature and flame-resistant synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, a separate annular flange secured to and extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a separate first electrical connector block mounted in the slipring chamber in the hub for rotation therewith, a separate second electrical connector block stationarily mounted adjacent the first electrical connector block, one of said electrical connector blocks having circular slipring contacts, and the other of said electrical connector blocks having spring contacts engaging the slipring contacts.

30. A cord reel structure for an electric cord comprising a stationary arbor, a molded high-temperature and flame-resistant synthetic plastic hollow hub rotatably mounted on said arbor and including a cylindrical wall, a circular radially arranged partition wall intermediate the ends of the hub and forming a spring motor chamber and a slipring chamber within the hub, and a central bearing in the partition wall for rotatably mounting the hub on the arbor, an annular flange extending radially from each end of the hub and cooperating with the cylindrical wall of the hub to form a reel for receiving the electric cord coiled thereon, a spiral spring arranged in the spring motor chamber having its inner end connected to the arbor and its outer end connected to the interior of the cylindrical wall of the hub for rotating the hub in one direction to coil the electric cord thereon between the flanges but allowing uncoiling of the electric cord therefrom, a circular slipring block mounted in the circular slipring chamber in the hub and carrying circular slipring contacts, a stationarily mounted pickup block carrying spring contacts engaging the circular slip ring contacts, a plurality of outwardly facing slots in the slipring chamber end of the hub, and a plurality of radially extending ears on the circular slipring block received in the outwardly facing slots for mounting the circular slipring block in the slipring chamber in the hub.

31. A cord reel structure as defined in claim 30 wherein the central bearing in the partition wall of the hub includes an elongated sleeve extending from the partition wall into the slipring chamber, and the circular slipring block has a central opening for accommodating the stationary arbor and also receiving the end of the elongated bearing sleeve to minimize distortion of the slipring block and assure proper centering thereof.

* * * * *